March 18, 1941.  A. E. COLCHER  2,235,143
RADIOGRAPH APPARATUS
Filed Jan. 30, 1939  2 Sheets-Sheet 1
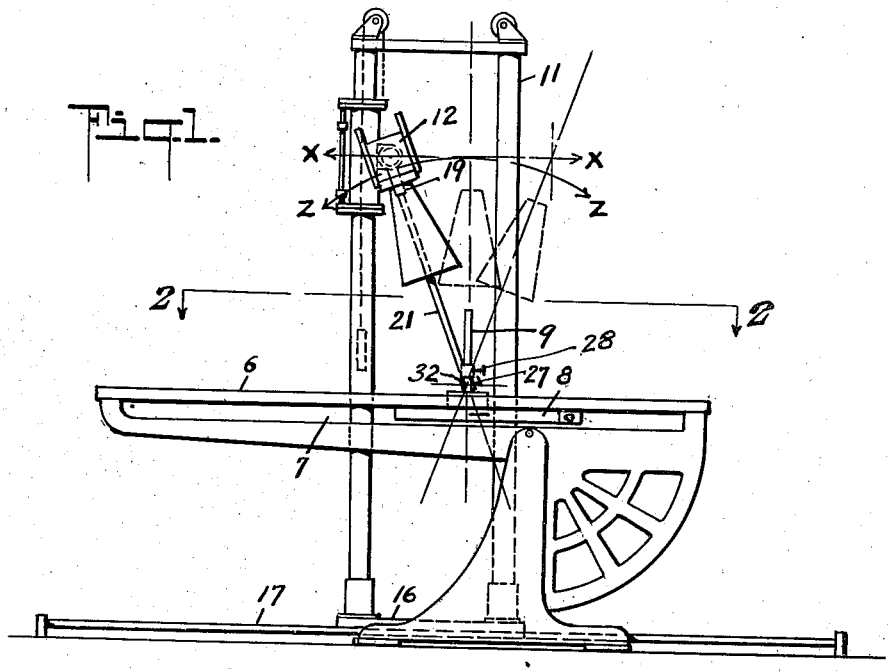
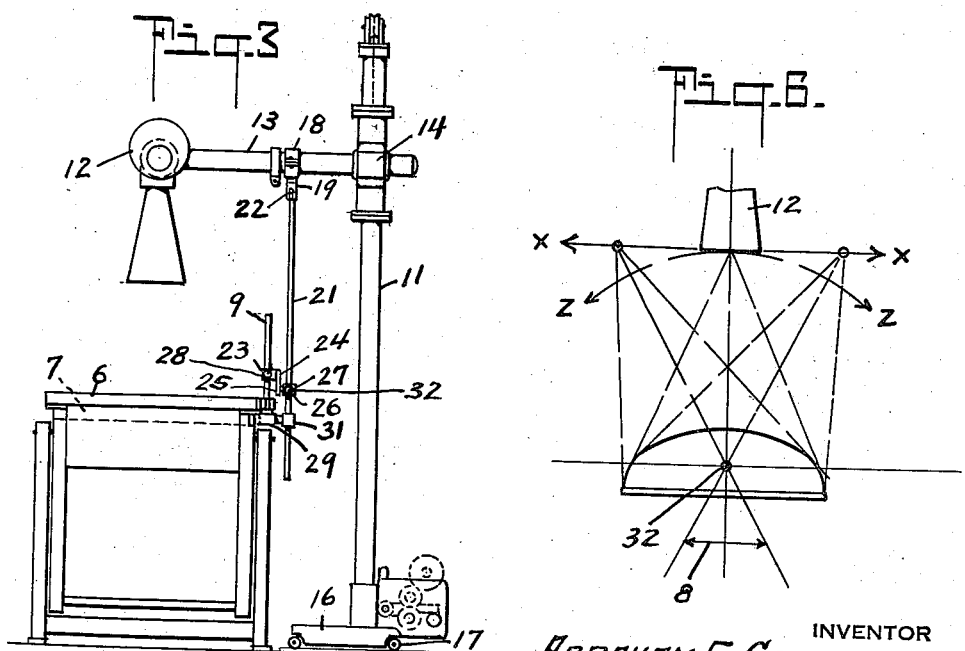
INVENTOR
ABRAHAM E. COLCHER.
BY
ATTORNEY March 18, 1941.  A. E. COLCHER  2,235,143
RADIOGRAPH APPARATUS
Filed Jan. 30, 1939  2 Sheets-Sheet 2
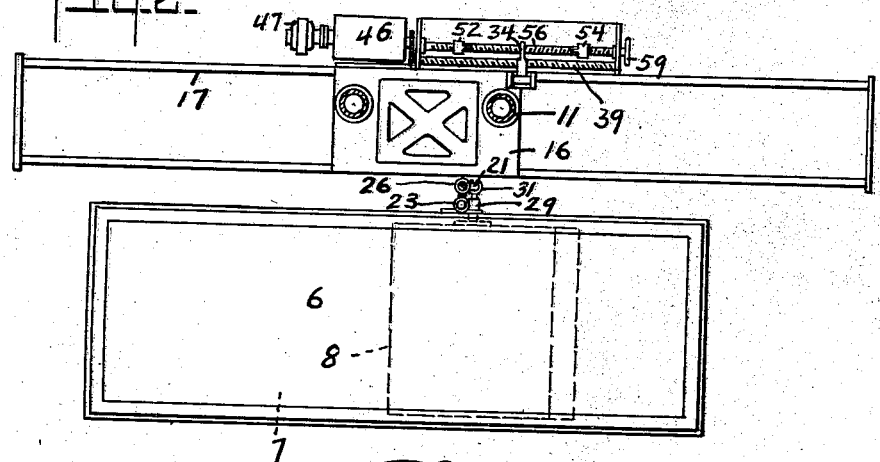
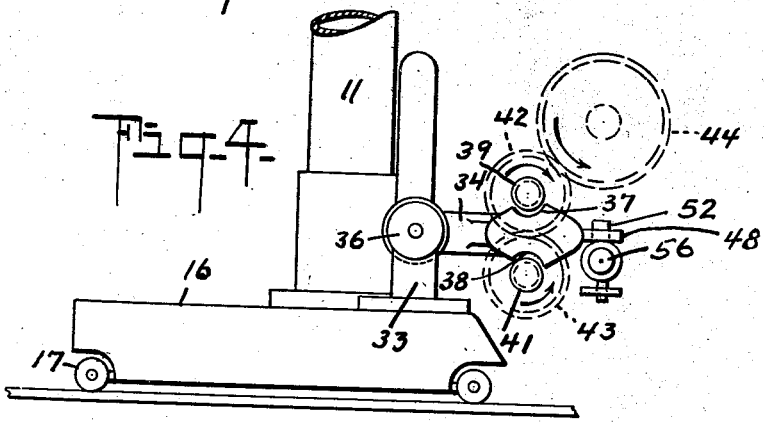
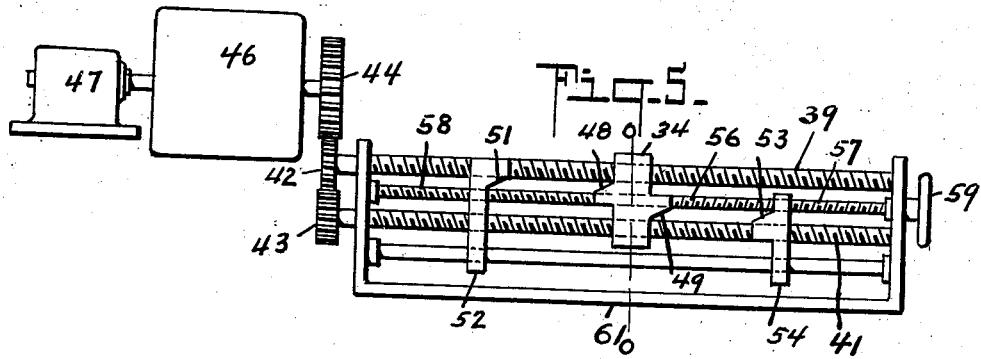
INVENTOR
ABRAHAM E. COLCHER,
BY
ATTORNEY Patented Mar. 18, 1941

2,235,143

UNITED STATES PATENT OFFICE 2,235,143

RADIOGRAPH APPARATUS

Abraham E. Colcher, Philadelphia, Pa.

Application January 30, 1939, Serial No. 253,498

11 Claims. (Cl. 250—61.5)

This invention relates to a radiographic machine, and has particular reference to mechanisms for making radiographs of body sections by the harmonious movement of the Roentgen-ray tube and plate holder in a vertical plane.

The object of the present invention is to provide radiographic apparatus which will produce radiographs of any desired body section by a movement of the Roentgen-ray tube and plate holder in a vertical plane wherein the speed of said tube and holder is constant as to each.

A further object of the invention is to provide means for automatically moving the Roentgen-ray tube and plate holder reciprocally in a single vertical plane and limiting the length of the path through which each operates as well as of the time consumed for each stroke.

A still further object of the invention is to provide mechanisms which can be readily incorporated into new machines and which can be attached to machines now in use.

According to the invention the radiographic apparatus comprises a table, a plate holder beneath the table and provided with space for reciprocating longitudinal movement, a stationary element attached to the table, a carriage mounted for reciprocating movement and carrying a Roentgen-ray tube, a lever adjustably pivoted at a selected focal point on said stationary element, and connected at one side of said pivotal point with said tube and loosely connected at the other side of said point with said holder, and means associated with said carriage for automatically and continuously reciprocating said carriage and holder in opposite directions and in a fixed vertical plane. The means for automatically operating the carriage may consist of screw members and a threaded member adapted to alternately mesh with said screw members, and means for changing the threaded member from one screw member to the other. The machine may also be provided with means definitely locating the point at which the threaded member is withdrawn from one screw member and engaged with the other, so as to definitely fix the stroke of the reciprocating motion. The machine may also be provided with means for selectively fixing the time for each stroke of the reciprocating motion.

The drawings illustrate an embodiment of the invention and the views therein are as follows:

Figure 1 is a front view of a radiographic apparatus embodying my invention,

Figure 2 is a longitudinal sectional view of the same on the line 2—2 of Figure 1, Figure 3 is an end view, Figure 4 is an enlarged end view of the mechanism for imparting reciprocating motion to the Roentgen-ray tube carriage, with the casing removed, Figure 5 is an enlarged rear view of such apparatus, and Figure 6 is a diagrammatic view of the rays passing through a given focal point onto a chosen section when the tube and plate are reciprocated.

As illustrated in the drawings, the radiograph apparatus, or so-called X-ray machine, is provided with a table 6 upon which the patient may lie. This table is provided with a longitudinal recess or slot 7 which houses the plate holder 8. Extending upward in a vertical direction from the table 6 and secured thereto at its lower end is the post 9.

The carriage 11 has a Roentgen-ray tube 12 mounted on an arm 13 adjustably secured at 14 to one of the uprights of said carriage. This carriage has a base 16 slidably mounted on tracks or rails 17. The arm 13 has a collar 18 adjustably secured thereto, and provided with a depending socket member 19 in which one end of a lever 21 extends. This socket 19 is provided with a set screw or other means 22 for fixedly securing the end of the rod in said socket when desired.

The upright post 9 on the table is provided with a bushing 23 which has a downwardly extending arm 24 provided with an oppositely extending bushing 26. This bushing 26 is pivotally mounted on the arm at 25, and is provided with a set screw or other means 27 for fixedly securing same to the lever 21 intermediate its ends. The bushing 23 is also provided with a set screw or other means 28 for fixedly securing it to the upright post 9.

The plate holder 8 has a centrally located arm 29 terminating in a split bushing 31, which straddles the lever 21 below the fixed pivotal point 32, and provides for the sliding of said lever through same.

The base 16 has a stand 33 on which a member 34 is pivotally mounted at 36. This mounting 36 may consist of a spring friction mounting while the upper arcuate face 37 and lower arcuate face 38 of said member 34 are screw threaded for alternately meshing with threaded screw members 39 and 41 driven in opposite directions by the pinions 42 and 43 respectively mounted thereon. Both of these pinions are meshed on their adjacent faces and are driven by a spur gear 44 extending from the gear change box 46. This box contains standard speed reducing mechanism, and motion is imparted to the apparatus by means of a motor 47.

The member 34 has extensions provided, with cam faces 48 and 49, the former of which may engage a like face 51 on a limiting member 52, while the latter may engage a like face 53 on the limiting member 54. These limiting members are mounted on a screw 56, one-half of which, 57, is left-hand threaded, and the other half, 58, right-hand threaded. The screw has an operating wheel 59 for bringing the limiting members 52 and 54 closer to or farther from the center line "0." The limiting members 52 and 54 may be slidably mounted on a tie rod 61 to prevent the same from turning.

It will be readily seen that when the upper end of the lever 21 is freely movable in the socket member 19 that the arm 13 may be fixedly secured to the carriage 11 so that the reciprocating movement of said carriage is horizontal, that is to say, in accordance with the arrows X—X, so that the distance from the focal point 32 to the center of the Roentgen-ray tube will slightly increase as the same moves forward on each side of the vertical center line, while if the set screw 22 is tightened down on the lever 21 so as to fixedly secure the same in the socket 19, the distance between the pivotal point 32 and the center of the Roentgen-ray tube 12 will be fixed, and the tube will subscribe an arc Z—Z in its reciprocal movement.

The plate holder 8 moving in the longitudinal slideway 7 must always move in a horizontal plane, consequently, the distance between the pivotal point 32 and the point at which the split bushing 31 engages the lever 21, will always increase as the plate holder moves in either direction from the vertical center line.

The operation of the hand-wheel 59 will positively determine the throw or length of stroke of the carriage carrying the Roentgen-ray tube, by locating the limiting members 52 and 54, so that their cam faces 51 and 53 will strike against the cam faces 48 and 49 respectively of the member 34, and immediately disconnect one or the other of the threaded parts 37 or 38 from the screw 39 or 41 respectively, and engage the other threaded part with the opposite screw, thereby causing the carriage to return over the route it had just traveled. These limiting members cause an inverted pendulum-like swing to the Roentgen-ray tube and a pendulum-like movement to the plate holder; the distance or length of stroke on each side of the vertical center being regulated entirely by the position of the limiting members 52 and 54.

The speed reducing mechanism 46 may be nicely fixed, so that the travel of the threaded member 34 on each side of the vertical center "0," whether the distance be two inches, four inches, six inches, or up to nine inches, may be caused to consume one and one-half seconds, three seconds, six seconds, etc.

The focal point 32 represents the plane or section of which the radiograph is to be produced, and this focal point is readily adjustable by opening the set screws 27 and 28, and moving the bushings 23 and 26, so that the center of the bushing 26 coincides exactly with the plane on which lies the section to be radiographed.

The Roentgen-ray tube 12 and plate holder 8 are adapted to move in a single vertical plane only, and the travel of both the tube and the plate is harmonious throughout. By using the word "harmonious" I mean that the rate of speed of each of these elements is uniform throughout the entire length of a reciprocal stroke, that is to say, the only pause or dwell will be while the threaded member 34 is being moved by one of the limiting members or dogs from engagement with one of the screws 39 and 41 to the other of said screws.

While in the present instance I have shown a radiograph apparatus in which the tracks 17 upon which the Roentgen-ray tube carriage 11 moves to and fro is separate from that part of the apparatus provided with the table 6 and plate holder 8, it may, in some instances, be advisable to fixedly secure these rails or tracks to the table apparatus, so that when the lever 21 is perpendicular the threaded member 34 will be located exactly on the center line "0" between the limiting members or dogs 52 and 54.

Of course, the radiograph apparatus and operating mechanism therefor shown and described herein may be modified in various ways without departing from the invention herein set forth and hereafter claimed.

The invention is hereby claimed as follows:

1. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, and means associated with said carriage for automatically and continuously reciprocating said carriage and holder in opposite directions.

2. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, and means associated with said carriage for imparting harmonius reciprocating movement to said carriage and holder.

3. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, and screw means associated with said carriage for automatically and continuously reciprocating said carriage and holder in opposite directions.

4. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, oppositely rotating screw members, a threaded member adapted to alternately mesh with said screw members for automatically and continuously reciprocating said carriage and holder in opposite directions, and means for moving the threaded member alternately into engagement with the screw members.

5. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, oppositely rotating screw members, a threaded member pivotally mounted in said carriage adapted to alternately mesh with said screw members for automatically and continuously reciprocating said carriage and holder in opposite directions, and means for moving the threaded member alternately into engagement with the screw members.

6. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, means associated with said carriage for automatically and continuously reciprocating said carriage and holder in opposite directions, and means for predeterminately fixing the time consumed for each reciprocal movement.

7. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustable pivoted at a selected focus point on said stationary element and connected at one side of said pivotal point with said tube and loosely connected at the other side of said point with said holder, means associated with said carriage for imparting harmonious reciprocating movement to said carriage and holder, and means for predeterminately fixing the time consumed for each reciprocating movement.

8. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, screw means associated with said carriage for automatically and continuously reciprocating said carriage and holder in opposite directions, and means for predeterminately fixing the time consumed for each reciprocating movement.

9. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, oppositely rotating screw members, a threaded member adapted to alternately mesh with said screw members for automatically and continuously reciprocating said carriage and holder in opposite directions, means for moving the threaded member alternately into engagement with the screw members, and means for predeterminately fixing the time consumed for each reciprocating movement.

10. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, oppositely rotating screw members, a threaded member pivotally mounted in said carriage adapted to alternately mesh with said screw members for automatically and continuously reciprocating said carriage and holder in opposite directions, means for moving the threaded member alternately into engagement with the screw members, and means for predeterminately fixing the time consumed for each reciprocating movement.

11. An apparatus for making radiographs of body sections comprising a table, a plate holder beneath the table and provided with space for reciprocating longitudinal movement, a stationary element attached to the table, a carriage mounted for reciprocating movement and carrying an X-ray tube, a lever adjustably pivoted at a selected focus point on said stationary element and connected at one side of said pivotal point with said tube and loosely connected at the other side of said point with said holder, a pair of meshed gears, a screw rotated by each of said gears, a threaded member adapted to be moved to mesh either of said screws, and means for moving the threaded member alternately into engagement with the screw members.

ABRAHAM E. COLCHER.